(12) United States Patent
Marinescu et al.

(10) Patent No.: US 10,891,578 B2
(45) Date of Patent: Jan. 12, 2021

(54) PREDICTING EMPLOYEE PERFORMANCE METRICS

(71) Applicant: INTERNATIONAL BUSINESS MACHINES CORPORATION, Armonk, NY (US)

(72) Inventors: Radu Marinescu, Dublin (IE); Oznur Alkan, Clonsilla (IE); Adi I. Botea, Dublin (IE); Akihiro Kishimoto, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 15/933,729

(22) Filed: Mar. 23, 2018

(65) Prior Publication Data
US 2019/0295012 A1    Sep. 26, 2019

(51) Int. Cl.
*G06Q 10/06* (2012.01)
*G06N 7/00* (2006.01)
*G06N 20/00* (2019.01)

(52) U.S. Cl.
CPC ......... *G06Q 10/0639* (2013.01); *G06N 7/005* (2013.01); *G06N 20/00* (2019.01)

(58) Field of Classification Search
None
See application file for complete search history.

(56) References Cited

U.S. PATENT DOCUMENTS

| 7,593,861 | B2 | 9/2009 | Morrel-Samuels |
| 7,865,390 | B2 | 1/2011 | Muralitharan et al. |
| 2006/0282306 | A1* | 12/2006 | Thissen-Roe ......... G06Q 10/06 705/7.14 |
| 2008/0016412 | A1* | 1/2008 | White ..................... H04L 43/08 714/48 |
| 2008/0077588 | A1* | 3/2008 | Zhang .................... G06Q 30/00 |
| 2011/0077989 | A1 | 3/2011 | Akred et al. |
| 2011/0106734 | A1* | 5/2011 | Boult ................... G06K 9/6292 706/12 |
| 2011/0131082 | A1 | 6/2011 | Manser et al. |
| 2011/0145740 | A1* | 6/2011 | McCue ................. G16H 50/30 715/764 |
| 2014/0032280 | A1 | 1/2014 | Etchegoyen |
| 2015/0170442 | A1* | 6/2015 | Senalp ................ G07C 5/0808 701/29.1 |
| 2016/0217701 | A1* | 7/2016 | Brown ..................... G09B 7/00 |
| 2017/0083848 | A1 | 3/2017 | Edelman et al. |

OTHER PUBLICATIONS

Mohajer, Prediction of Employees' Performance of an Organization Using Bayesian Network (Year: 2017).*
Yildiz et al., "A decision support system to evaluate employee performance and its application," Journal of the Faculty of Engineering and Architecture of Gazi University, vol. 23, No. 1, Mar. 2008 (11 pages).

* cited by examiner

*Primary Examiner* — Akosua Kyereme-Tuah
(74) *Attorney, Agent, or Firm* — Griffiths & Seaton PLLC

(57) ABSTRACT

Embodiments for predicting employee performance metrics in a computing environment by a processor. An employee performance is predicted over a selected period of time using a dynamic probabilistic model based on historical data, a time window, current and historical observations of the one or more performance metrics, or a combination thereof.

17 Claims, 7 Drawing Sheets

US 10,891,578 B2

PREDICTING EMPLOYEE PERFORMANCE METRICS

BACKGROUND OF THE INVENTION

Field of the Invention

The present invention relates in general to computing systems, and more particularly, to various embodiments for predicting employee performance metrics using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment.

SUMMARY OF THE INVENTION

Various embodiments for predicting employee performance evaluation metrics over a selected period of time by a processor are provided. In an additional aspect, various embodiments are provided for predicting employee performance metrics in a computing environment by a processor. An employee performance is predicted over a selected period of time using a dynamic probabilistic model based on historical data, a time window, current and historical observations of the one or more performance metrics, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
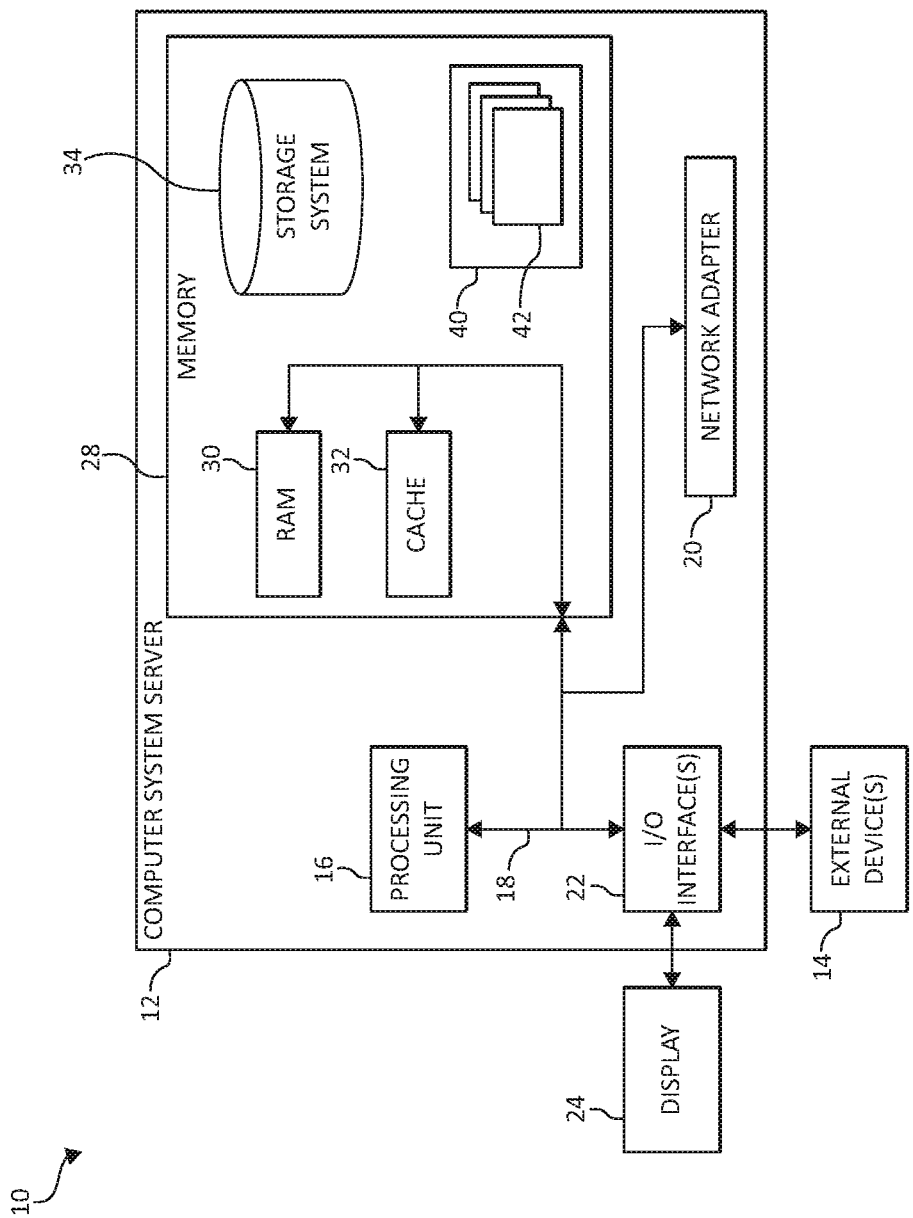
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, business, and so forth.

Moreover, people-driven organizations tend to rely on an employee-centric organizational structure. The representation can enable the lookup of an employee's position and association within the hierarchy. Employee skills and performances are directly or indirectly encoded in many different information sources ranging from their curriculum vitae ("CVs") to skill-sets, performance evaluations, and/or projects associated with them within the organization. As a result of this, a full understanding of an employee's skill-set and performance evaluation is critical for many companies.

Employee performance may impact productivity, sales, and overall company performance. Employee performance also impacts the financial stability along with the quality of service or products of a business. Evaluating employee performance is relatively time consuming for a business but is essential and relevant when different skills from different employees need to be combined to form a team such as, for example, to maximize overall performance of a team of the business. However, many skills and performances of an employee depend upon other skills, performance metrics, and variables, which may change over a period of time. For example, an employee with a skill for communication and presenting ideas, products, or services may have a large network of clients. Knowing the dependencies between skills, performance metrics, or other variables are critical particularly for forecasting employee performance. Accordingly, a need exists for predicting employee performance evaluation metrics over a selected period of time.

In one aspect, the present invention provides a solution for predicting employee performance metrics over a selected period of time by monitoring and predicting the employee performance along several different dimensions (e.g., performance metrics) over a selected period of time (e.g., "time window" or "time horizon"). The employee predictions may include using employee historical performance data using a dynamic Bayesian network model. Probabilistic inference may be used to compute posterior probability distributions of one or more performance measures along the time window. One or more explanations of current or past events in the employee performance data may be determined, provided, or computed. A sensitivity analysis may be performed to discover the most relevant variables (or performance metrics) that one could act upon other variables (or performance metrics) in order to improve the employee's performance over a period of time.

In one aspect, employee performance metrics may be predicted over a selected period of time using a dynamic probabilistic model based on historical data, a time window, current and historical observations of the one or more performance metrics, or a combination thereof.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
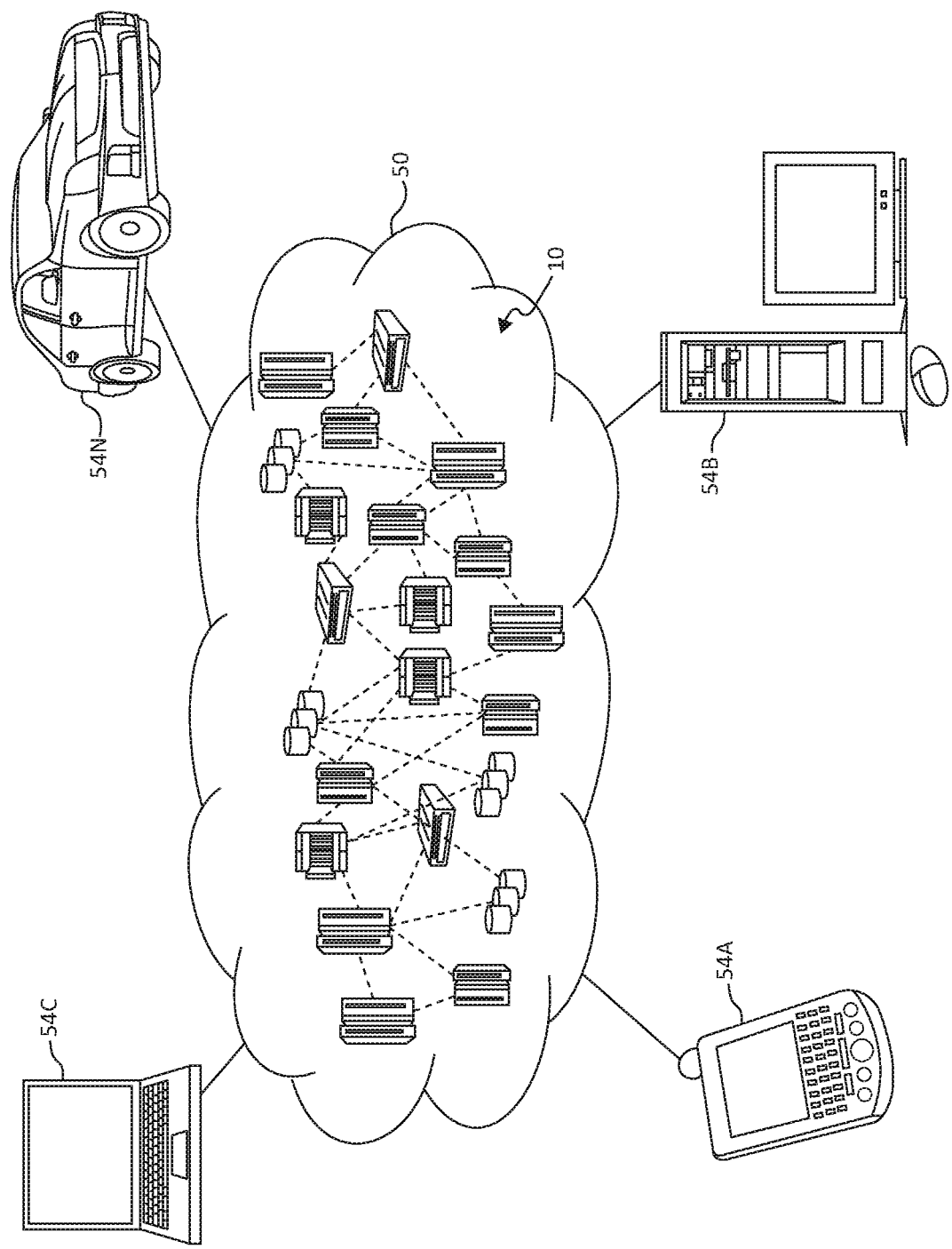
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
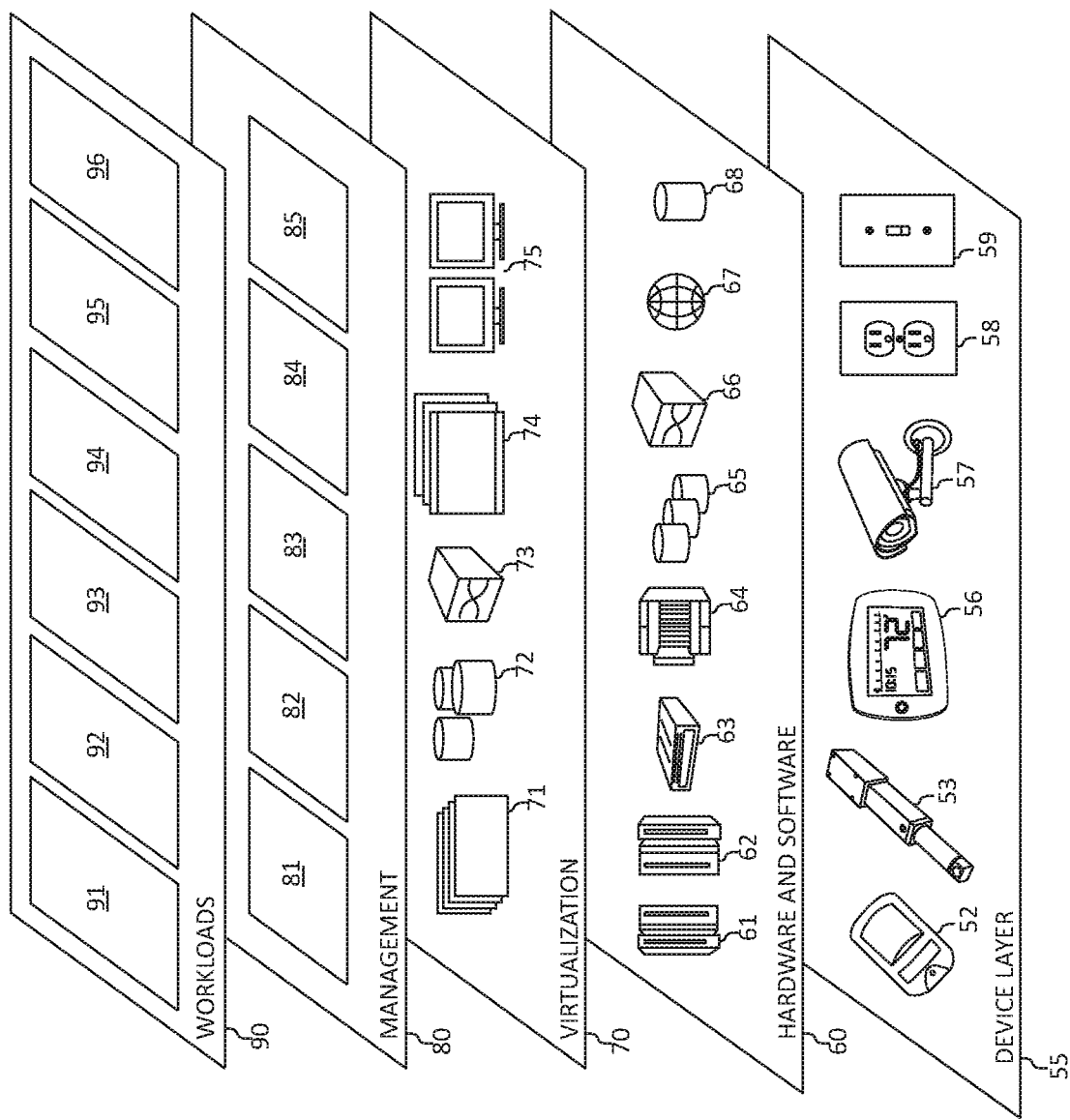
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for predicting employee performance metrics. In addition, workloads and functions 96 for predicting employee performance metrics may include such operations as data analysis (including data collection and processing from organizational databases, online information, knowledge domains, data sources, and/or social networks/media, and other data storage systems, and predictive and data analytics functions. One of ordinary skill in the art will appreciate that the workloads and functions 96 for predicting employee performance metrics may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, mechanisms of the present invention provide for predicting employee performance evaluation metrics over time. In one aspect, historical performance data, a time window (e.g., "time horizon" such as, for example, monthly, quarterly, yearly, etc.), current and/or past observations of one or more performance metrics may be collected, gathered, and used as input (e.g., input data) to a machine learning component. The machine learning component may generate a probability distribution of one or more performance metrics at one or more future time steps.

The machine learning component may learn from the input data a dynamic probabilistic model which captures dependencies between each of the employee performance metrics (if any) over the defined or selected time period. An explanation of the input observations and associated values in the learned dynamic probabilistic model may be determined and/or computed. A sensitivity analysis may be performed on the dynamic probabilistic model variables to detect the minimal set of variables that have the strongest influence over another set of variables.

Figure 4:
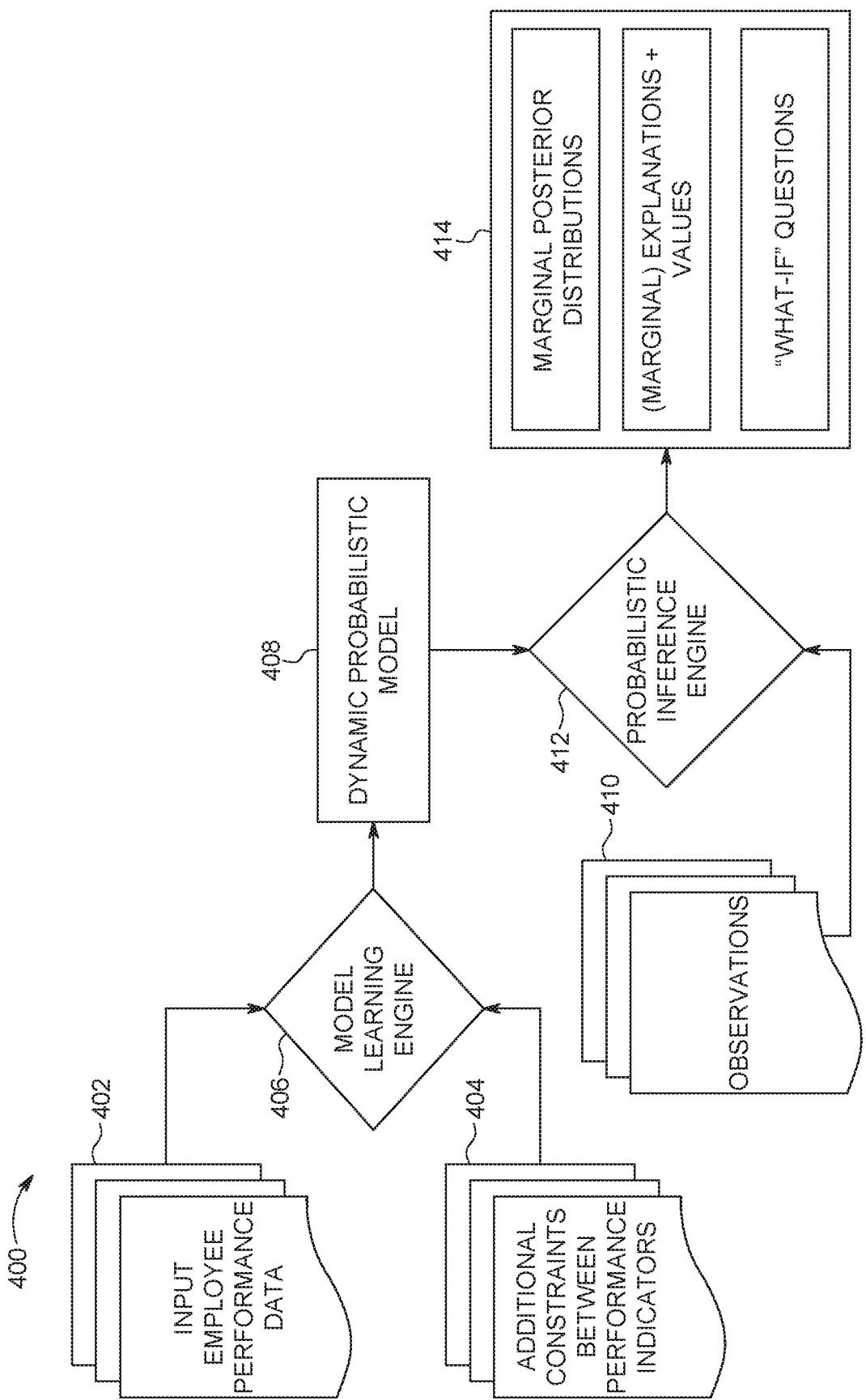
FIG. 4 is a block/flow diagram depicting forecasting demand for predicting employee performance metrics according to an embodiment of the present invention.

Turning now to FIG. 4, a block/flow diagram 400 depicts predicting employee performance metrics. In one aspect, one or more of the components, modules, services, applications, and/or functions described in FIGS. 1-3 may be used in FIG. 4. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality. With the foregoing in mind, the module blocks 400 may also be incorporated into various hardware and software components of a system for targeted learning and recruitment in accordance with the present invention. Many of the functional blocks 400 may execute as background processes on various components, either in distributed computing components, or on the user device, or elsewhere.

At block 406, employee performance data 402 and one or more additional constraints between one or more performance indicators 404 (e.g., performance metrics) may be input and/or ingested into a model learning engine (e.g., a machine learning component to learn a model). That is, the employee performance data 402 and one or more additional constraints between one or more performance indicators 404 may include historical data (e.g., previous employee evaluations, performance reviews, skills, education, etc.), a time window, current and historical observations of the one or more performance metrics, or other data.

The machine learning engine may be initialized and use the employee performance data 402 and one or more additional constraints between one or more performance indicators 404 (e.g., the historical data, the time window, the current and historical observations of the one or more performance metrics, or other data) to learn and generate a dynamic probabilistic model, as in block 408. The machine learning engine may learn dependencies between the one or more performance metrics over the selected period of time.

In one aspect, the machine learning engine may use historical data to learn a dynamic Bayesian network model ("M") with "k" time steps, where k is the size of the input time window. Expectation-Maximization (EM) may be used for any learning particularly if there is missing data. Also, maximum likelihood estimation ("MLE") may be used to search one or more parameters (e.g., parameters of performance metrics) of the dynamic Bayesian network mode (if data fully observed). The MLE may estimate the parameters of a statistical model (e.g., the dynamic Bayesian network model), given observations. The MLE may find the parameter values that maximize the likelihood function, given the observations.

A search operation, for structure learning, may be used and input constraints and/or relations between performance indicator variables to constrain the structure learning operation. For each of the future performance indicator variables ("$V_i$") one or more probabilistic inferences (e.g., variable elimination, weighted mini-buckets) may be performed to compute the marginal posterior distribution ("P") (e.g., P(Vi|observations)). The machine learning engine may return P(Vi|observations).

The dynamic probabilistic model may be used in conjunction with one or more learned observations 410 relating to the employee and/or employee performance metrics as input into a probabilistic inference engine, as in block 412.

The probabilistic inference engine may generate as output 414 marginal posterior distributions for each performance indicator variable for a future time period (e.g., marginal posterior distributions of a set of performance metrics that influence another set of performance metrics), explanations and values of the performance metrics, and one or more interventional queries (e.g., "what-if" questions), which may be converted into one or more probabilistic queries.

Figure 5:
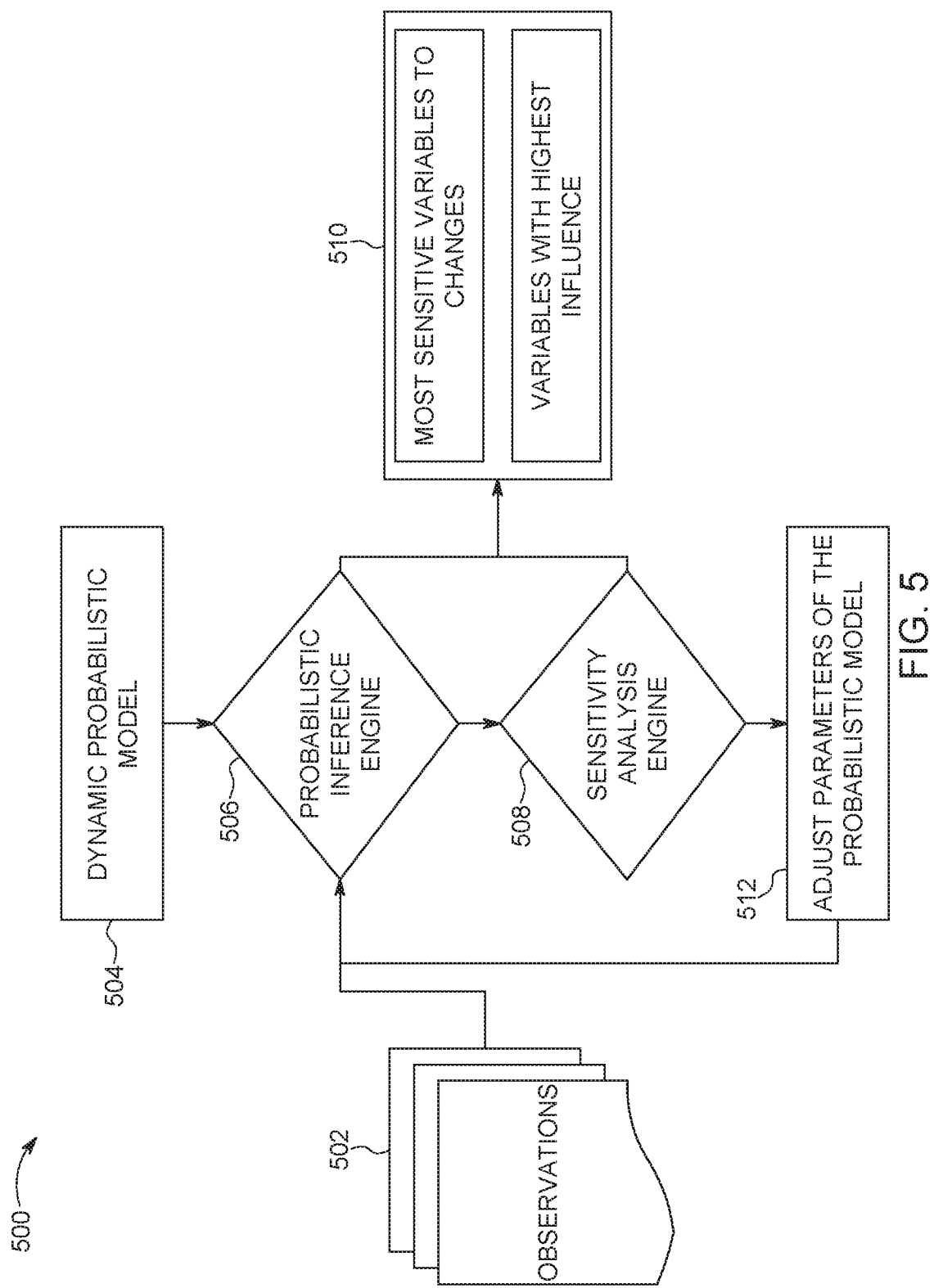
FIG. 5 is a block/flow diagram depicting sensitivity analysis operation for predicting employee performance metrics in accordance with aspects of the present invention.
Figure 6:
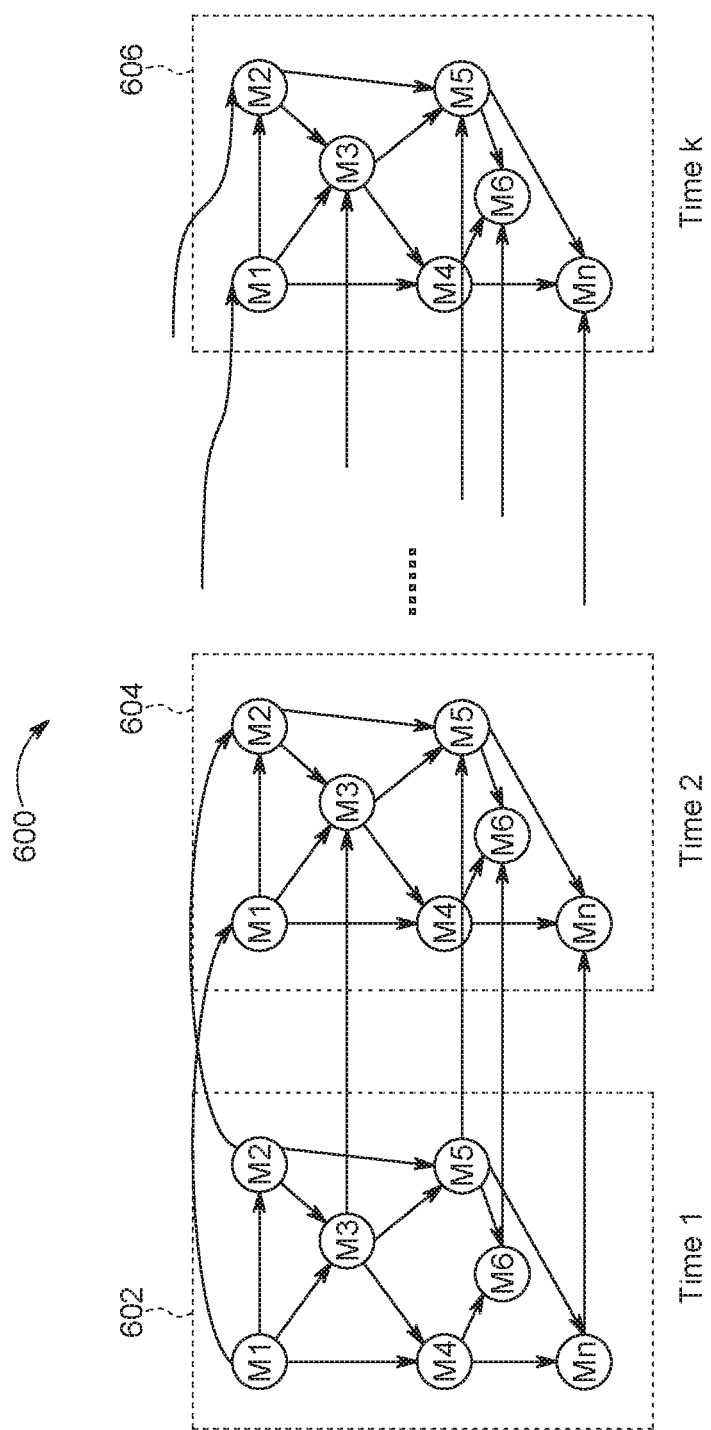
FIG. 6 is a block diagram depicting a dynamic probabilistic model for a selected period of time according to an embodiment of the present invention.

Turning now to FIG. 5, a block/flow diagram 500 depicts sensitivity analysis operation for predicting employee performance metrics. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality in accordance with various aspects of the present invention.

As illustrated, block 504 depicts a dynamic probabilistic model 504 (which may be determined in FIG. 4 and may be a dynamic Bayesian network model), and one or more observations 502 of an employee and/or employee performance metrics that may be used as input into a probabilistic inference engine, as in block 506. The probabilistic inference engine may generate as output marginal posterior distributions, explanations and values of the performance metrics, and one or more interventional queries, which may be used by a sensitivity analysis engine, as in block 508. The sensitivity analysis engine may perform a sensitivity analysis on one or more parameters (e.g., variables of the performance metrics) to identify those of the one or more performance metrics having a sensitivity to change based on adjusting the one or more parameters of the one or more performance metrics. That is, the probabilistic inference engine may execute a probabilistic inference (e.g., AND/OR search) to compute the marginal maximum a posteriori probability (MMAP) or MAP explanation of the current observations and return the MMAP and/or MAP assignment together with its value in a dynamic Bayesian network model. A sensitivity analysis may be performed on the dynamic probabilistic model to identify the most sensitive variables/values as well as the variables that have the strongest influence over the other variables.

From block 508, one or more parameters of the one or more performance metrics of a probabilistic model may be adjusted, as in block 512. The adjusted parameters may be sent and used in block 506.

Also, the sensitivity analysis engine may use the output of the probabilistic inference engine and together, in conjunction with the probabilistic inference engine, the sensitivity analysis engine may determine, as output 510, those of the parameters (e.g., variables of the performance metrics) that are most sensitive to changes according to a predetermined threshold and/or as compared to other parameters. Also, output 510 may include those of the parameters (e.g., variables of the performance metrics) having a greatest amount of influence on other parameters or performance metrics as compared to other parameters.

Figure 7:
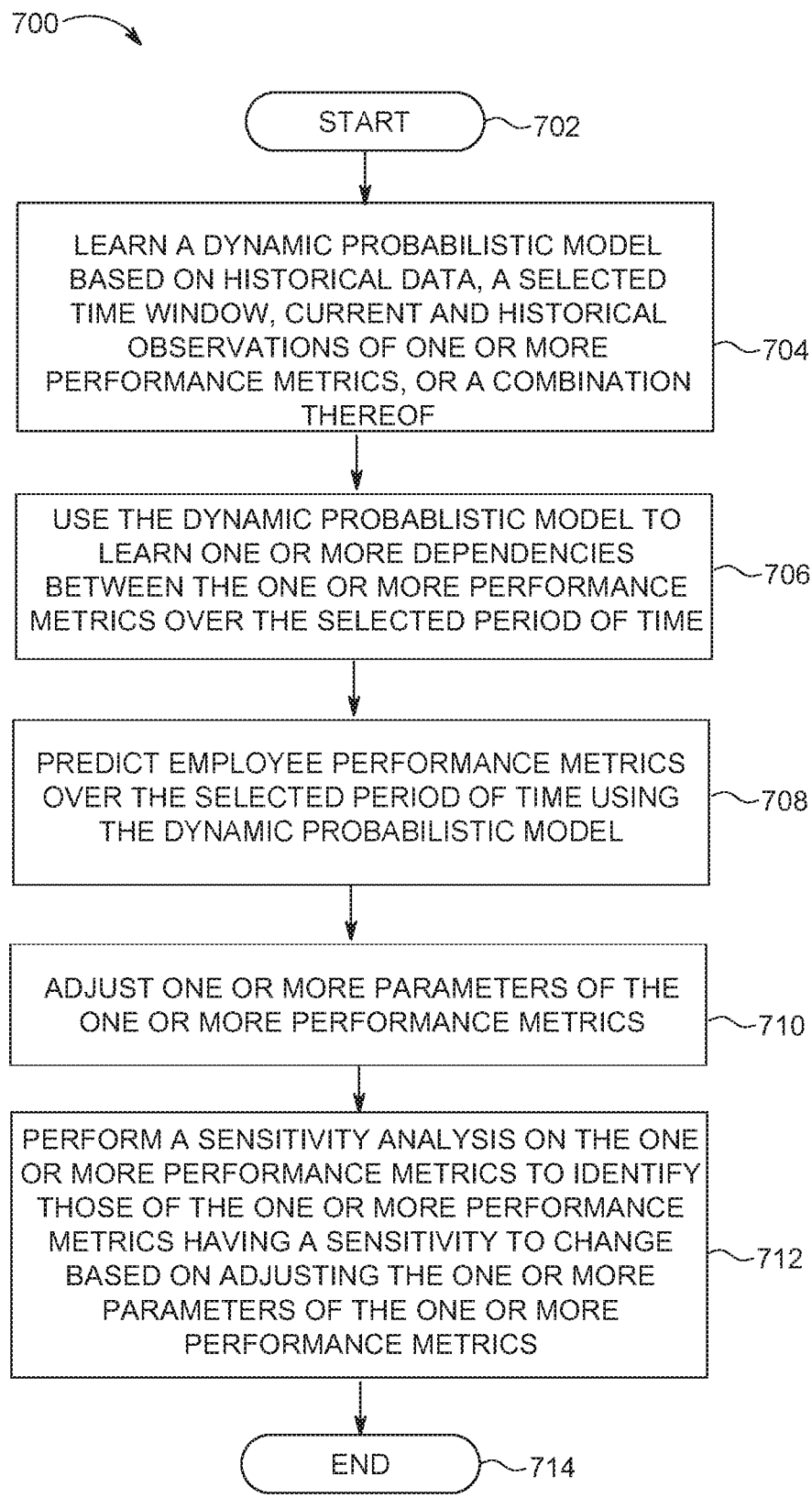
FIG. 7 a flowchart diagram depicting an additional exemplary method for predicting employee performance metrics in accordance with aspects of the present invention.

Turning now to FIG. 7, a method 700 for predicting employee performance metrics by a processor is depicted, in which various aspects of the illustrated embodiments may be implemented. That is, FIG. 7 is a flowchart of an additional example method 700 for predicting employee performance metrics in a computing environment according to an example of the present invention. The functionality 700 may be implemented as a method executed as instructions on a machine, where the instructions are included on at least one computer readable medium or one non-transitory machine-readable storage medium. The functionality 700 may start in block 702. A dynamic probabilistic model may be learned based on historical data, a time window, current and historical observations of one or more performance metrics, or a combination thereof, as in block 704. The dynamic probabilistic model may be used to learn one or more dependencies between the one or more performance metrics over a selected period of time, as in block 706. Employee performance metrics may be predicted over the selected period of time using the dynamic probabilistic model, as in block 708. That is, the dynamic probabilistic model may be used to generate a probability distribution of one or more performance metrics at one or more future time steps. One or more parameters of one or more performance metrics, as in block 710. A sensitivity analysis may be performed on one or more performance metrics to identify those of the one or more performance metrics having a sensitivity to change based on adjusting the one or more parameters of the one or more performance metrics, as in block 712. The functionality 700 may end in block 714.

In one aspect, in conjunction with and/or as part of at least one block of FIG. 7, the operations of 700 may include one or more of each of the following. A machine learning mechanism may be initialized and use the historical data, the time window, the current and historical observations of the one or more performance metrics, or a combination thereof to learn the dynamic probabilistic model containing dependencies between the one or more performance metrics over the selected period of time. One or more dependencies between the one or more performance metrics may be learned over the selected period of time.

The operations of 700 may adjust one or more parameters of one or more performance metrics. A sensitivity analysis may be performed on one or more performance metrics to identify those of the one or more performance metrics having a sensitivity to change based on adjusting the one or more parameters of the one or more performance metrics. A set of performance metrics having an impact on an alternative set of performance metrics may be determined according to a sensitivity analysis.

The operations of 700 may convert one or more interventional queries into one or more probabilistic queries, and/or determine a marginal posterior distribution of a second set of performance metrics that influence a first set of performance metrics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for predicting employee performance metrics in a computing environment by a processor, comprising:
   receiving, by the processor, current and historical observations of one or more performance metrics related to employee performance from a database storing the current and historical observations;
   generating, by the processor, a dynamic probabilistic model of a dynamic Bayesian network of a predicted employee performance, the dynamic probabilistic model having a plurality of time steps representative of a time window according to historical data and the current and historical observations of the one or more performance metrics received from the database;
   performing, by the processor, a structure learning operation using the generated dynamic probabilistic model, the structure learning operation constrained by a plurality of variables of the one or more performance metrics to generate one or more probabilistic inferences of the plurality of variables; wherein the structure learning operation converts one or more interventional queries of a search operation into one or more probabilistic queries used to generate the one or more probabilistic inferences;

responsive to performing the structure learning operation constrained by the plurality of variables, determining, by the processor, a marginal posterior distribution of a second set of the one or more performance metrics that influence a first set of the one or more performance metrics according to the one or more probabilistic inferences of the plurality of variables; and outputting, by the processor via a display, a resultant analysis of the predicted employee performance over a selected period of time according to the marginal posterior distribution of the one or more performance metrics of the dynamic probabilistic model; wherein the output further includes displaying certain variables of the plurality of variables of the one or more performance metrics having a greatest amount of influence, at a particular one of the plurality of time steps, on others of the plurality of variables of the one or more performance metrics as relatively compared to all of the plurality of variables of the one or more performance metrics.

2. The method of claim 1, further including using the dynamic probabilistic model to generate a probability distribution of one or more performance metrics at one or more future time steps.

3. The method of claim 1, further including initializing a machine learning mechanism using the historical data, the time window, the current and historical observations of the one or more performance metrics, or a combination thereof to learn the dynamic probabilistic model containing dependencies between the one or more performance metrics over the selected period of time.

4. The method of claim 1, further including learning one or more dependencies between the one or more performance metrics over the selected period of time.

5. The method of claim 1, further including:
adjusting one or more parameters of one or more performance metrics; and
performing a sensitivity analysis on one or more performance metrics to identify those of the one or more performance metrics having a sensitivity to change based on adjusting the one or more parameters of the one or more performance metrics.

6. The method of claim 1, further including determining a set of performance metrics having an impact on an alternative set of performance metrics according to a sensitivity analysis.

7. A system for predicting employee performance metrics in a computing environment, comprising:
one or more computers with executable instructions that when executed cause the system to:
receive, by a processor associated with the one or more computers, current and historical observations of one or more performance metrics related to employee performance from a database storing the current and historical observations;
generate, by the processor, a dynamic probabilistic model of a dynamic Bayesian network of a predicted employee performance, the dynamic probabilistic model having a plurality of time steps representative of a time window according to historical data and the current and historical observations of the one or more performance metrics received from the database;
perform, by the processor, a structure learning operation using the generated dynamic probabilistic model, the structure learning operation constrained by a plurality of variables of the one or more performance metrics to generate one or more probabilistic inferences of the plurality of variables; wherein the structure learning operation converts one or more interventional queries of a search operation into one or more probabilistic queries used to generate the one or more probabilistic inferences;
responsive to performing the structure learning operation constrained by the plurality of variables, determine, by the processor, a marginal posterior distribution of a second set of the one or more performance metrics that influence a first set of the one or more performance metrics according to the one or more probabilistic inferences of the plurality of variables; and
output, by the processor via a display, a resultant analysis of the predicted employee performance over a selected period of time according to the marginal posterior distribution of the one or more performance metrics of the dynamic probabilistic model; wherein the output further includes displaying certain variables of the plurality of variables of the one or more performance metrics having a greatest amount of influence, at a particular one of the plurality of time steps, on others of the plurality of variables of the one or more performance metrics as relatively compared to all of the plurality of variables of the one or more performance metrics.

8. The system of claim 7, wherein the executable instructions use the dynamic probabilistic model to generate a probability distribution of one or more performance metrics at one or more future time steps.

9. The system of claim 7, wherein the executable instructions initialize a machine learning mechanism using the historical data, the time window, the current and historical observations of the one or more performance metrics, or a combination thereof to learn the dynamic probabilistic model containing dependencies between the one or more performance metrics over the selected period of time.

10. The system of claim 7, wherein the executable instructions learn one or more dependencies between the one or more performance metrics over the selected period of time.

11. The system of claim 7, wherein the executable instructions:
adjust one or more parameters of one or more performance metrics; and
perform a sensitivity analysis on one or more performance metrics to identify those of the one or more performance metrics having a sensitivity to change based on adjusting the one or more parameters of the one or more performance metrics.

12. The system of claim 7, wherein the executable instructions determine a set of performance metrics having an impact on an alternative set of performance metrics according to a sensitivity analysis.

13. A computer program product, by a processor, for predicting employee performance metrics, the computer program product comprising a non-transitory computer-readable storage medium having computer-readable program code portions stored therein, the computer-readable program code portions comprising:

an executable portion that receives, by the processor, current and historical observations of one or more performance metrics related to employee performance from a database storing the current and historical observations;

an executable portion that generates, by the processor, a dynamic probabilistic model of a dynamic Bayesian network of a predicted employee performance, the dynamic probabilistic model having a plurality of time steps representative of a time window according to historical data and the current and historical observations of the one or more performance metrics received from the database;

an executable portion that performs, by the processor, a structure learning operation using the generated dynamic probabilistic model, the structure learning operation constrained by a plurality of variables of the one or more performance metrics to generate one or more probabilistic inferences of the plurality of variables; wherein the structure learning operation converts one or more interventional queries of a search operation into one or more probabilistic queries used to generate the one or more probabilistic inferences;

an executable portion that, responsive to performing the structure learning operation constrained by the plurality of variables, determines, by the processor, a marginal posterior distribution of a second set of the one or more performance metrics that influence a first set of the one or more performance metrics according to the one or more probabilistic inferences of the plurality of variables; and an executable portion that outputs, by the processor via a display, a resultant analysis of the predicted employee performance over a selected period of time according to the marginal posterior distribution of the one or more performance metrics of the dynamic probabilistic model; wherein the output further includes displaying certain variables of the plurality of variables of the one or more performance metrics having a greatest amount of influence, at a particular one of the plurality of time steps, on others of the plurality of variables of the one or more performance metrics as relatively compared to all of the plurality of variables of the one or more performance metrics.

14. The computer program product of claim 13, further including an executable portion that uses the dynamic probabilistic model to generate a probability distribution of one or more performance metrics at one or more future time steps.

15. The computer program product of claim 13, further including an executable portion that:
   initializes a machine learning mechanism using the historical data, the time window, the current and historical observations of the one or more performance metrics, or a combination thereof to learn the dynamic probabilistic model containing dependencies between the one or more performance metrics over the selected period of time; and
   learns one or more dependencies between the one or more performance metrics over the selected period of time.

16. The computer program product of claim 13, further including an executable portion that:
   adjusts one or more parameters of one or more performance metrics; and
   performs a sensitivity analysis on one or more performance metrics to identify those of the one or more performance metrics having a sensitivity to change based on adjusting the one or more parameters of the one or more performance metrics.

17. The computer program product of claim 13, further including an executable portion that determines a set of performance metrics having an impact on an alternative set of performance metrics according to a sensitivity analysis.

* * * * *